(12) United States Patent
Zhang et al.

(10) Patent No.: US 8,762,613 B2
(45) Date of Patent: Jun. 24, 2014

(54) METHOD FOR MANAGING A PROCESSOR, LOCK CONTENTION MANAGEMENT APPARATUS, AND COMPUTER SYSTEM

(75) Inventors: Xiaofeng Zhang, Hangzhou (CN); Han Zheng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 13/489,202

(22) Filed: Jun. 5, 2012

(65) Prior Publication Data

US 2013/0046910 A1 Feb. 21, 2013

Related U.S. Application Data

(63) Continuation of application No. PCT/CN2011/078539, filed on Aug. 17, 2011.

(51) Int. Cl.
*G06F 12/00* (2006.01)
*G06F 7/00* (2006.01)

(52) U.S. Cl.
USPC .......................... 710/200; 707/704; 718/107

(58) Field of Classification Search
USPC ........... 710/200; 707/704; 718/100, 102, 107, 718/108
See application file for complete search history.

(56) References Cited

U.S. PATENT DOCUMENTS

| | | | |
|---|---|---|---|
| 6,629,175 B1 * | 9/2003 | Manning et al. | 710/200 |
| 2003/0163642 A1 * | 8/2003 | Borkenhagen et al. | 711/121 |
| 2007/0234003 A1 * | 10/2007 | Naruse | 711/202 |
| 2010/0211554 A1 * | 8/2010 | Reid et al. | 707/703 |

FOREIGN PATENT DOCUMENTS

| | | |
|---|---|---|
| CN | 1367432 A | 9/2002 |
| CN | 1945539 A | 4/2007 |
| CN | 102081557 A | 6/2011 |

OTHER PUBLICATIONS

Carey, Michael J.; Krishnamurthi, Sanjay; and Livny, Miron; "Load Control for Locking: The 'Half-and-Half' Approach"; Computer Sciences Technical Report #880; Computer Sciences Department, University of Wisconsin; Madison, WI; Oct. 1989.*
Cui, Yan; Zhang, Weida; Chen, Yu; and Shi, Yunachun; "A Scheduling Method for Avoiding Kernel Lock Thrashing on Multi-Cores"; 2010 16th International Conference on Parallel and Distributed Systems; IEEE Computer Society; 2010.*
Office Action issued in corresponding Chinese Patent Application No. 201180001723.8, mailed Feb. 8, 2013.
International Search Report issued in corresponding PCT Patent Application No. PCT/CN2011/078539, mailed May 24, 2012.

* cited by examiner

*Primary Examiner* — Glenn A Auve
(74) *Attorney, Agent, or Firm* — Brinks, Gilson & Lione (57) ABSTRACT

A method for managing a processor includes: obtaining an online request of a processor of a computer system; collecting lock contention information of the computer system if a lock contention status flag indicates a non-lock thrashing status; determining whether the computer system is in a lock thrashing status according to the lock contention information; and accepting the online request if it is determined that the computer system is in a non-lock thrashing status. By using the management method according to embodiments of the present application, processor performance degradation and a waste of idle processor resources that are caused by the case that the computer system is in a lock thrashing status are prevented, thereby improving utilization efficiency of processor resources and promoting overall performance of the computer system.

21 Claims, 4 Drawing Sheets

METHOD FOR MANAGING A PROCESSOR, LOCK CONTENTION MANAGEMENT APPARATUS, AND COMPUTER SYSTEM

CROSS-REFERENCE TO RELATED APPLICATIONS

This application is a continuation of International Application No. PCT/CN2011/078539, filed on Aug. 17, 2011, which is hereby incorporated by reference in its entirety.

FIELD OF THE APPLICATION

The present application relates to the computer field, and in particular, to a method for managing a processor, a lock contention management apparatus, and a computer system in the computer field.

BACKGROUND OF THE APPLICATION

In the field of high-performance computing, a computer system usually includes multiple processors, and each processor may be integrated with two or more complete computing engines (namely, cores), thereby significantly improving the performance of the computer system.

However, in a multiprocessor and multicore application scenario, an expansion effect of an operating system of a computer system is not satisfactory. Especially, with the constant growth of the number of processors or cores of the computer system, maximum processing capability of the computer system fails to increase linearly, and even declines. Among many factors which result in degradation of the computer system performance, a lock is the most important factor. At present, lock bottlenecks may be solved by lock refinement, lock free (Lock Free) or other manners. However, a lot of locks exist in the operating system, a lock optimization solution to the lock bottleneck problem is not applicable to each lock, and furthermore, it is impossible to optimize all locks in the computer system.

A proper solution is required to manage processors of the computer system to improve the performance of the computer system.

SUMMARY

Embodiments of the present application provide a method for managing a processor, a lock contention management apparatus, and a computer system, which are capable of improving utilization efficiency of processor resources and promoting overall performance of a computer system.

In one aspect, an embodiment of the present application provides a method for managing a processor. The method includes: obtaining an online request of a processor of a computer system; collecting lock contention information of the computer system if a lock contention status flag indicates a non-lock thrashing status; determining whether the computer system is in a lock thrashing status according to the lock contention information; and accepting the online request if the computer system is in a non-lock thrashing status.

In another aspect, an embodiment of the present application provides a lock contention management apparatus. The lock contention management apparatus includes: a lock contention interface module, configured to obtain an online request of a processor of a computer system; a lock contention control module, where the lock contention control module includes a flag read unit, a status determination unit, and an online acceptance unit, and the flag read unit is configured to read a lock contention status flag of the lock contention management apparatus; a lock contention detection module, configured to obtain the online request on the lock contention interface module, and collect lock contention information of the computer system when the lock contention status flag read by the flag read unit indicates a non-lock thrashing status. The status determination unit is configured to determine whether the computer system is in a lock thrashing status according to the lock contention information collected by the lock contention detection module; the online acceptance unit is configured to accept the online request when the status determination unit determines that the computer system is in a non-lock thrashing status.

In still another aspect, an embodiment of the present application provides a computer system. The computer system includes multiple processors and a lock contention management apparatus according to an embodiment of the present application, where the lock contention management apparatus is configured to manage lock contention between the multiple processors. The lock contention management apparatus includes: a lock contention interface module, configured to obtain an online request of a processor of a computer system; a lock contention control module, where the lock contention control module includes a flag read unit, a status determination unit, and an online acceptance unit, and the flag read unit is configured to read a lock contention status flag of the lock contention management apparatus; a lock contention detection module, configured to obtain the online request on the lock contention interface module, and collect lock contention information of the computer system when the lock contention status flag read by the flag read unit indicates a non-lock thrashing status. The status determination unit is configured to determine whether the computer system is in a lock thrashing status according to the lock contention information collected by the lock contention detection module; the online acceptance unit is configured to accept the online request when the status determination unit determines that the computer system is in a non-lock thrashing status.

Based on the foregoing solution, through a method for managing a processor of a computer system, a lock contention management apparatus, and a computer system according to the embodiments of the present application, by collecting lock contention information of the computer system to determine the lock contention status of the computer system and managing the online or offline status of the processor according to the lock contention status of the computer system, processor performance degradation and a waste of idle processor resources that are caused by the case that the computer system is in a lock thrashing status are prevented, thereby improving the utilization efficiency of processor resources and promoting the overall performance of the computer system.

BRIEF DESCRIPTION OF THE DRAWINGS

To illustrate the technical solutions according to the embodiments of the present application more clearly, the accompanying drawings for describing the embodiments are introduced briefly in the following. Apparently, the accompanying drawings in the following description are only some embodiments of the present application, and persons of ordinary skill in the art can derive other drawings from the accompanying drawings without creative efforts.

DETAILED DESCRIPTION OF THE EMBODIMENTS

The technical solutions according to the embodiments of the present application are clearly and completely described in the following with reference to the accompanying drawings. The embodiments in the following description are a part rather than all of the embodiments of the present application. All other embodiments obtained by persons of ordinary skill in the art based on the embodiments of the present application without creative efforts shall fall within the protection scope of the present application.

It should be understood that the technical solutions according to the embodiments of the present application are applicable to various types of computer system, including personal computers (Personal Computer, abbreviated as PC), large-scale computer systems, and various types of supercomputer (Supercomputer).

Figure 1:
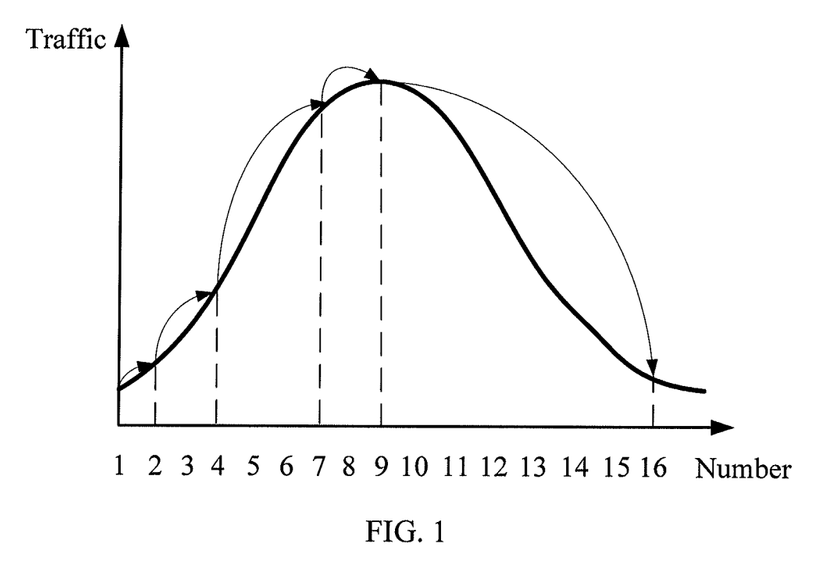
FIG. 1 is a schematic curve diagram of a corresponding relationship between the number of processors of a computer system and the traffic of the computer system.

Generally, as the number of processors of a computer system increases, processing capability of the computer system is improved significantly. However, when the number of processors increases constantly, the maximum processing capability of the computer system may not increase accordingly due to lock contention, or the maximum processing capability of the computer system even declines due to excessive lock contention. For example, as shown in FIG. 1, when the number of processors is smaller than 10, the traffic of the computer system gradually increases as the number of processors increases, that is, the maximum processing capability of the computer system increases gradually. When the number of processors is equal to or greater than 10, the traffic of the computer system does not increase but decreases sharply as the number of processors increases constantly. Therefore, processors of the computer system need to be managed to improve the performance of the computer system.

Figure 2:
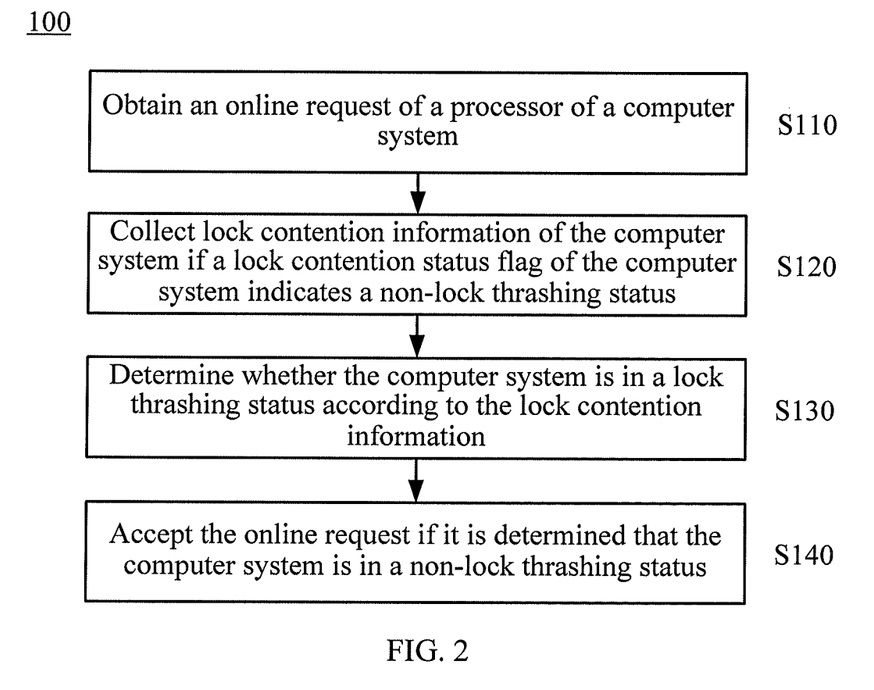
FIG. 2 is a schematic flow chart of a method for managing a processor of a computer system according to an embodiment of the present application.

FIG. 2 is a schematic flow chart of a method 100 for managing a processor of a computer system according to an embodiment of the present application. As shown in FIG. 2, the method 100 includes the following steps:

S110: Obtain an online request of a processor of a computer system.

S120: Collect lock contention information of the computer system if a lock contention status flag of the computer system indicates a non-lock thrashing status.

S130: Determine whether the computer system is in a lock thrashing status according to the lock contention information.

S140: Accept the online request if it is determined that the computer system is in a non-lock thrashing status.

After receiving the online request of the processor, a lock contention management apparatus or a resource manager of the computer system starts to monitor a lock contention status of the computer system. Specifically, when the computer system obtains the online request of the processor and the lock contention status flag of the computer system indicates the non-lock thrashing status, the lock contention management apparatus or the resource manager collects lock contention information of the computer system, and accepts the online request when it is determined that the computer system is in a non-lock thrashing status according to the lock contention information.

Therefore, in the method for managing a processor of the computer system according to the embodiment of the present application, by collecting lock contention information of the computer system to determine a lock contention status of the computer system and managing the online or offline status of the processor according to the lock contention status of the computer system, processor performance degradation and a waste of idle processor resources that are caused by the case that the computer system is in a lock thrashing status are prevented, thereby improving utilization efficiency of processor resources and promoting overall performance of the computer system.

In another aspect, in the method for managing a processor of the computer system according to the embodiment of the present application, the monitoring of the lock contention status of the computer system is started only after an online or offline request of the processor is obtained. In this manner, occupation of unnecessary overhead of the computer system is prevented when no processor requests to be online or offline, thereby reducing the overhead of the computer system and further improving the processing capability of the computer system.

It should be understood that, in the embodiment of the present application, when only one process of the computer system is allowed to access shared resources at a time, the computer system usually uses a lock mechanism to protect the shared resources. However, when two or more processes need to access the shared resources simultaneously, lock contention occurs.

It should be also understood that the computer system has two types of lock contention status, namely, a lock thrashing status and a non-lock thrashing status. The lock thrashing status refers to that the computer system is in an excessive lock contention status, in such case, the computer system spends a lot of time on the lock contention, thereby affecting normal performance of the computer system. The non-lock thrashing status refers to that the computer system is in a normal lock contention status.

In this embodiment of the present application, when the lock contention management apparatus or the resource manager of the computer system obtains an online request, if the lock contention status flag of the computer system indicates a non-lock thrashing status and it is determined that the computer system is in a lock thrashing status according to collected lock contention information, the lock contention management apparatus or the resource manager may reject the online request and set the lock contention status flag to indicate a lock thrashing status. In such case, the processor fails to go online.

In the embodiment of the present application, when the lock contention management apparatus or the resource manager of the computer system obtains an online request, the lock contention management apparatus or the resource manager may reject the online request of the processor if the lock contention status flag of the computer system indicates a lock thrashing status. In such case, the processor fails to go online.

In the embodiment of the present application, when obtaining an offline request, the lock contention management apparatus or the resource manager of the computer system may accept the offline request of the processor and set the lock contention status flag to indicate a non-lock thrashing status no matter the lock contention status flag of the computer system indicates a lock thrashing status or a non-lock thrashing status. In such case, the processor goes offline successfully.

In the embodiment of the present application, alternatively, when the computer system is initialized, the lock contention status flag of the computer system is set to the non-lock thrashing status. That is, when the computer system is initialized, the computer system is in a non-lock thrashing status by default.

In the embodiment of the present application, alternatively, when the lock contention management apparatus or the resource manager of the computer system determines that the computer system is in a lock thrashing status, the lock contention management apparatus or the resource manager may record the lock contention information for subsequent performance analysis and notify the lock contention information to a computer system administrator.

It should be understood that the embodiment of the present application may be used in an application scenario of a physical machine, or in an application scenario of a virtual machine. For the application scenario of the physical machine, the physical machine only needs to monitor whether the entire computer system is in a lock contention status; therefore, a lock contention status flag may be set, so as to indicate the lock contention status of the computer system. For the application scenario of the virtual machine, whether each virtual machine is in a lock contention status needs to be monitored; therefore, a lock contention status flag needs to be set for each virtual machine, so as to indicate a lock contention status of the virtual machine. To be simplified, in this embodiment of the present application, an example of an application scenario of a physical machine is taken as an example for description. However, the embodiment of the present application is not limited thereto.

A method 200 for managing a processor of a computer system according to an embodiment of the present application is described in detail below with reference to FIG. 3.

Figure 3:
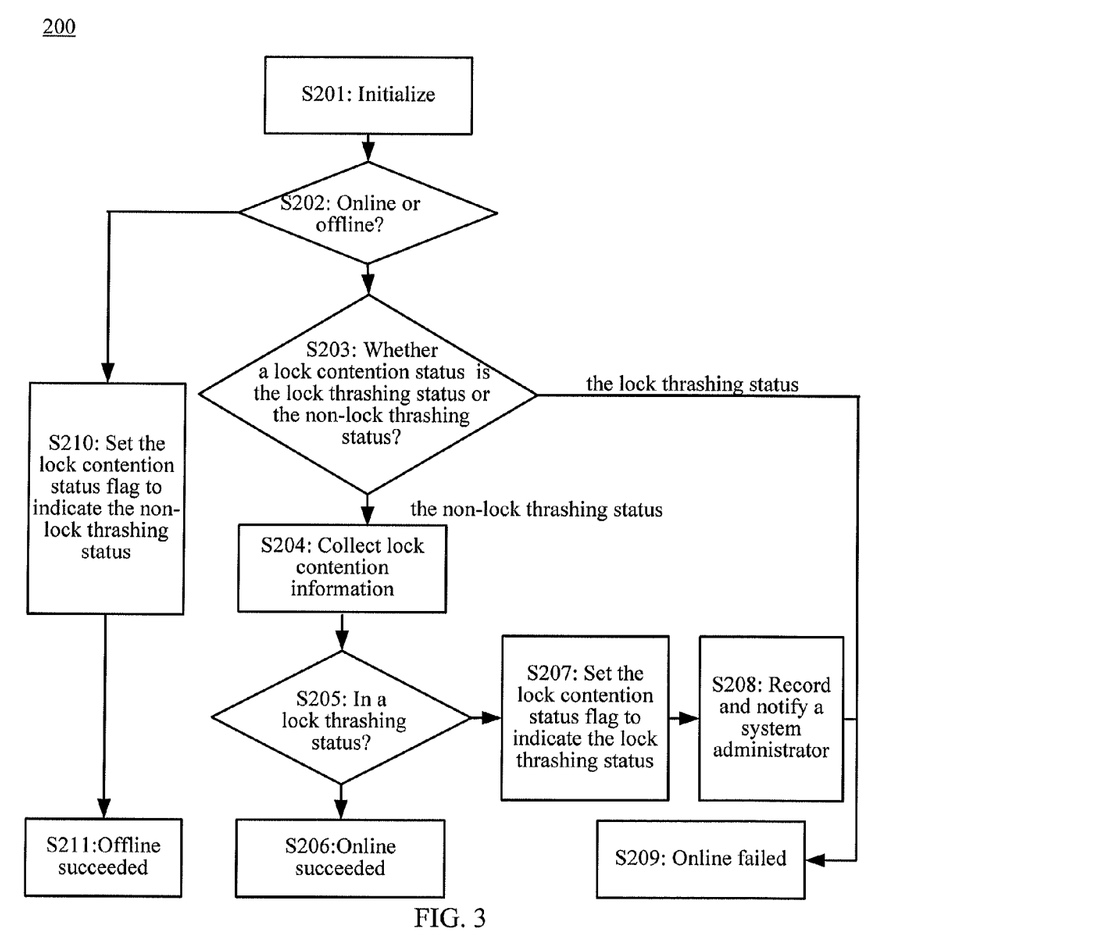
FIG. 3 is a schematic flow chart of a method for managing a processor of a computer system according to another embodiment of the present application.

As shown in FIG. 3, in S201, when a computer system is initialized, a clock contention management apparatus adds a lock contention status flag to indicate that a lock contention status of the computer system is a lock thrashing status or a non-lock thrashing status, and the lock contention status flag may be initialized to the non-lock thrashing status.

In S202, the lock contention management apparatus obtains an online or offline request of a processor. When the load of the computer system increases, more processor resources are required. At this time, a resource manager may transmit an online or offline request of a processor, so as to request the processor to be online or offline. The online or offline request includes an online request and an offline request. For example, the lock contention management apparatus may intercept the online or offline request of the processor by invoking a function.

When the online or offline request is an online request, the procedure proceeds to S203; when the online or offline request is an offline request, the procedure proceeds to S210.

In S203, the lock contention management apparatus judges the lock contention status flag of the computer system to determine whether a lock contention status of the computer system is the lock thrashing status or the non-lock thrashing status.

When the lock contention status flag of the computer system indicates the non-lock thrashing status, the procedure proceeds to S204; when the lock contention status flag of the computer system indicates the lock thrashing status, the procedure proceeds to S209.

In S204, the lock contention management apparatus collects lock contention information. For example, the lock contention management apparatus may invoke a lock function and at the same time invoke a lock information collection function to collect the lock contention information. The lock contention information may include a lock waiting duration, a lock occupation duration, and lock contention times.

In S205, the lock contention management apparatus determines whether the computer system is in the lock thrashing status according to the lock contention information. For example, a lock thrashing threshold may be set. When a ratio of the lock waiting duration to a total duration of the computer system exceeds the lock thrashing threshold, it is determined that the computer system is in the lock thrashing status; when a ratio of the lock waiting duration to a total duration of the computer system does not exceed the lock thrashing threshold, the computer system is in the non-lock thrashing status. For example, when a ratio of a sum of an average lock waiting duration and an average lock occupation duration to the total duration of the computer system is greater than 60%, it is determined that the computer system is in the lock thrashing status. It should be understood that the lock contention management apparatus may determine whether the computer system is in the lock thrashing status by using various mechanisms, which are not limited thereto.

When the lock contention management apparatus determines that the computer system is in the non-lock thrashing status, the procedure proceeds to S206; when the lock contention management apparatus determines that the computer system is in the lock thrashing status, the procedure proceeds to S207.

In S206, when determining that the computer system is in the non-lock thrashing status, the lock contention management apparatus accepts the online request of the processor. At this time, the processor goes online successfully, that is, the processor is in an available status.

In S207, when determining that the computer system is in the lock thrashing status, the lock contention management apparatus sets the lock contention status flag to indicate the lock thrashing status.

In S208, when determining that the computer system is in the lock thrashing status, the lock contention management apparatus may record the lock contention information for subsequent performance analysis and notify the lock contention information to a computer system administrator.

In S209, when determining that the computer system is in the lock thrashing status, the lock contention management apparatus rejects the online request of the processor. At this time, the processor fails to go online, that is, the processor is in an unavailable status.

In S210, when the online or offline request obtained by the lock contention management apparatus is an offline request, the lock contention management apparatus sets the lock contention status flag to indicate the non-lock thrashing status.

In S211, the lock contention management apparatus accepts the offline request of the processor. At this time, the processor goes offline successfully, that is, the processor changes from an available status to an unavailable status.

It should be understood that the sequence numbers in the foregoing procedures do not mean the order of the implementation. The implementation order of the procedures is determined according to functions and internal logic of the procedures, and should not impose any limitation on the implementation procedure of the embodiments of the present application. For example, S210 and S211 may be performed at the same time; or S210 is performed first, and then S211 is performed; or S211 is performed first, and then S210 is performed.

In the method for managing a processor of a computer system according to the embodiment of the present application, by collecting lock contention information of the computer system to determine a lock contention status of the computer system and managing the online or offline status of the process or according to a lock contention status of the computer system, processor performance degradation and a waste of idle processor resources that are caused by the case that the computer system is in a lock thrashing status are prevented, thereby improving utilization efficiency of processor resources and promoting overall performance of the computer system.

In the foregoing part, the method for managing a processor of the computer system according to the embodiment of the present application is described in detail with reference to FIG. 2 and FIG. 3. In the following part, a lock contention management apparatus and a computer system according to embodiments of the present application are described in detail with reference to FIG. 4 to FIG. 7.

Figure 4:
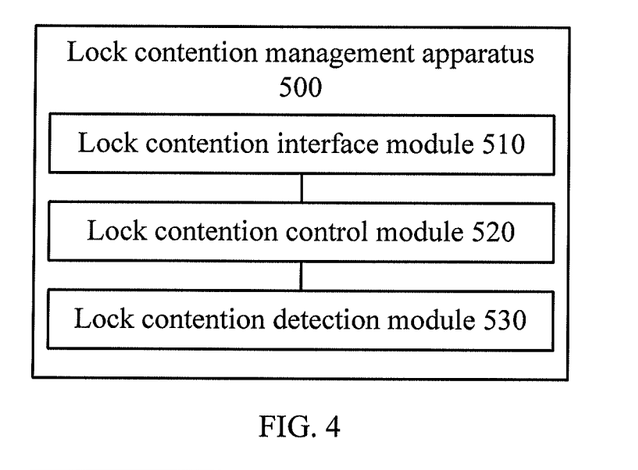
FIG. 4 is a schematic block diagram of a lock contention management apparatus according to an embodiment of the present application.

FIG. 4 shows a schematic block diagram of a lock contention management apparatus 500 according to an embodiment of the present application. As shown in FIG. 4, the lock contention management apparatus 500 includes:

a lock contention interface module 510, configured to obtain an online request of a processor of a computer system;

a lock contention control module 520, configured to read a lock contention status flag of the lock contention management apparatus 500; and a lock contention detection module 530, configured to obtain the online request on the lock contention interface module 510, and collect lock contention information of the computer system when the lock contention status flag read by the lock contention control module 520 indicates a non-lock thrashing status.

The lock contention control module 520 is further configured to determine whether the computer system is in a lock thrashing status according to the lock contention information collected by the lock contention detection module 530, and accept the online request of the processor when it is determined that the computer system is in a non-lock thrashing status.

Figure 5:
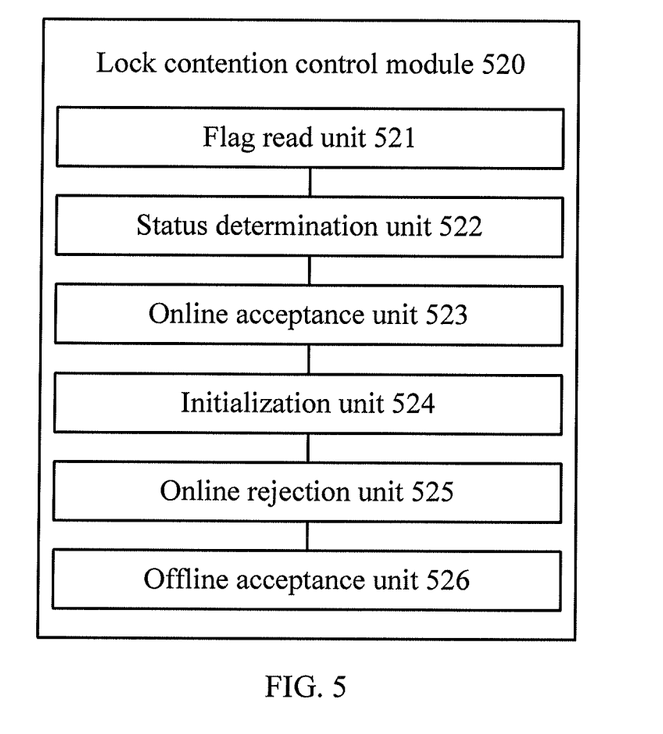
FIG. 5 is a schematic block diagram of a lock contention control module according to an embodiment of the present application.

Specifically, as shown in FIG. 5, the lock contention control apparatus 520 may include:

a flag read unit 521, configured to read the lock contention status flag of the lock contention management apparatus 500;

a status determination unit 522, configured to determine whether the computer system is in a lock thrashing status according to the lock contention information collected by the lock contention detection module 530; and an online acceptance unit 523, configured to accept the online request when the status determination unit 522 determines that the computer system is in a non-lock thrashing status.

In the lock contention management apparatus according to the embodiment of the present application, by collecting lock contention information of the computer system to determine a lock contention status of the computer system and managing the online or offline status of the processor according to the lock contention status of the computer system, processor performance degradation and a waste of idle processor resources that are caused by the case that the computer system is in a lock thrashing status are prevented, thereby improving utilization efficiency of processor resources and promoting overall performance of the computer system.

Alternatively, as shown in FIG. 5, the lock contention control module 520 further includes:

an initialization unit 524, configured to set the lock contention status flag to indicate the non-lock thrashing status when the computer system is initialized.

Alternatively, as shown in FIG. 5, the lock contention control module 520 further includes:

an online rejection unit 525, configured to reject the online request and set the lock contention status flag to indicate the lock thrashing status when the status determination unit 522 determines that the computer system is in a lock thrashing status.

Alternatively, as shown in FIG. 5, the lock contention interface module 510 is further configured to obtain an offline request of the processor of the computer system.

The lock contention control module 520 further includes:

an offline acceptance unit 526, configured to accept the offline request of the processor and set the lock contention status flag to indicate the non-lock thrashing status when the online or offline request obtained by the lock contention interface module 510 is the offline request.

Figure 6:
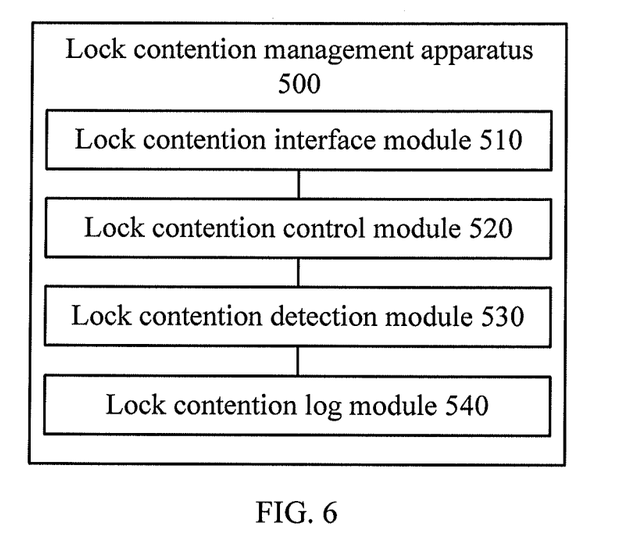
FIG. 6 is a schematic block diagram of a lock contention management apparatus according to another embodiment of the present application.

Alternatively, as shown in FIG. 6, the lock contention management apparatus 500 further includes:

a lock contention log module 540, configured to record the lock contention information when the status determination unit 522 determines that the computer system is in a lock thrashing status.

The lock contention management apparatus 500 according to the embodiment of the present application may correspond to a lock contention management apparatus in a method according to the embodiment of the present application, and the foregoing and other operations and/or functions of the modules in the lock contention management apparatus 500 are configured to implement corresponding procedures of the methods 100 and 200 shown in FIG. 2 and FIG. 3, respectively. To be simplified, details are not described herein.

In the lock contention management apparatus according to the embodiment of the present application, by collecting lock contention information of the computer system to determine a lock contention status of the computer system and managing the online or offline status of the processor according to the lock contention status of the computer system, processor performance degradation and a waste of idle processor resources that are caused by the case that the computer system is in a lock thrashing status are prevented, thereby improving utilization efficiency of processor resources and promoting overall performance of the computer system.

Figure 7:
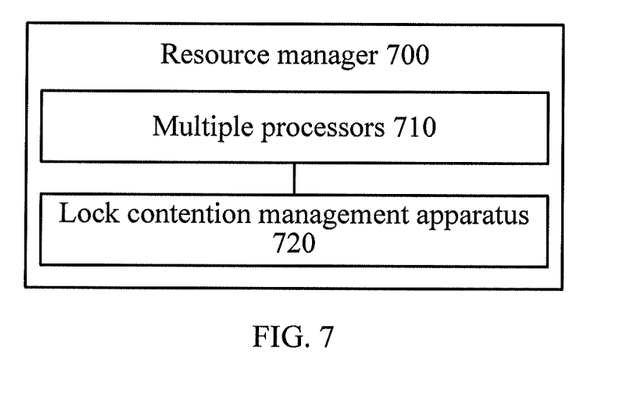
FIG. 7 is a schematic block diagram of a computer system according to an embodiment of the present application.

FIG. 7 shows a schematic block diagram of a computer system 700 according to an embodiment of the present application. As shown in FIG. 7, the computer system 700 includes multiple processors 710 and a lock contention management apparatus 720 according to an embodiment of the present application. The lock contention management apparatus 720 is configured to manage lock contention between the multiple processors 710, where the lock contention management apparatus 720 may include:

a lock contention interface module, configured to obtain an online request of a processor of a computer system;

a lock contention control module, where the lock contention control module includes a flag read unit, a status determination unit, and an online acceptance unit, and the flag read unit is configured to read a lock contention status flag of the lock contention management apparatus; and a lock contention detection module, configured to obtain the online request on the lock contention interface module, and collect lock contention information of the computer system when the lock contention status flag read by the flag read unit indicates a non-lock thrashing status.

The status determination unit is configured to determine whether the computer system is in a lock thrashing status according to the lock contention information collected by the lock contention detection module; the online acceptance unit is configured to accept the online request when the status determination unit determines that the computer system is in a non-lock thrashing status.

In an embodiment of the present application, alternatively, the lock contention control module further includes: an initialization unit, configured to set the lock contention status flag to indicate the non-lock thrashing status when the computer system is initialized. Alternatively, the lock contention control module further includes: an online rejection unit, configured to reject the online request and set the lock contention status flag to indicate the lock thrashing status when the status determination unit determines that the computer system is in a lock thrashing status. Alternatively, the lock contention interface module is further configured to obtain an offline request of the processor of the computer system. The lock contention control module further includes: an offline acceptance unit, configured to accept the offline request and set the lock contention status flag to indicate the non-lock thrashing status when the lock contention interface module obtains the offline request.

In the embodiment of the present application, alternatively, the lock contention management apparatus further includes: a lock contention log module, configured to record the lock contention information when the status determination unit determines that the computer system is in a lock thrashing status.

The lock contention management apparatus 720 according to the embodiment of the present application may correspond to the lock contention management apparatus 500 according to an embodiment of the present application, and the foregoing and other operations and/or functions of the modules in the lock contention management apparatus 720 are configured to implement corresponding procedures of the methods 100 and 200 shown in FIG. 2 and FIG. 3, respectively. To be simplified, details are not described herein.

In the computer system according to the embodiment of the present application, by collecting lock contention information of the computer system to determine a lock contention status of the computer system and managing the online or offline status of the processor according to the lock contention status of the computer system, processor performance degradation and a waste of idle processor resources that are caused by the case that the computer system is in a lock thrashing status are prevented, thereby improving utilization efficiency of processor resources and promoting overall performance of the computer system.

Persons of ordinary skill in the art may realize that, in combination with the embodiments herein, units and algorithm steps of each example described can be implemented with electronic hardware, computer software, or a combination thereof. In order to clearly describe the interchangeability between the hardware and the software, compositions and steps of each example have been generally described according to functions in the foregoing descriptions. Whether these functions are executed in a mode of hardware or software depends on particular applications and design constraint conditions of the technical solutions. Persons skilled in the art can use different methods to implement the described functions for each particular application, but it should not be considered that the implementation goes beyond the scope of the present application.

It can be clearly understood by persons skilled in the art that, for the purpose of convenient and brief description, for a detailed working process of the foregoing system, apparatus and unit, reference may be made to the corresponding process in the method embodiments, and the details will not be described herein again.

In several embodiments provided in the present application, it should be understood that the disclosed system, apparatus, and method may be implemented in other ways. For example, the described device embodiments are merely exemplary. For example, the unit division is merely logical function division and can be other division in actual implementation. For example, multiple units or components can be combined or integrated into another system, or some features can be ignored or not performed. Furthermore, the coupling, direct coupling or communication connection illustrated or discussed herein may be implemented through indirect coupling or communication connection between interfaces, apparatuses or units, and may be electrical, mechanical, or in other forms.

Units described as separate components may be or may not be physically separated. Components shown as units may be or may not be physical units, that is, may be integrated or distributed to a plurality of network units. Some or all of the modules may be selected to achieve the objective of the solution of the embodiment according to actual demands.

In addition, various functional units according to each embodiment of the present application may be integrated in one processing unit or may exist as various separate physical units, or two or more units may also be integrated in one unit. The integrated unit may be implemented through hardware, or may also be implemented in a form of software functional units.

When the integrated unit is implemented in the form of software functional units and sold or used as a separate product, the integrated unit may be stored in a computer readable storage medium. Therefore, the technical solution of the present application or the part that makes contributions to the prior art can be substantially embodied in the form of a software product. The computer software product is stored in a storage medium, and contains several instructions to instruct computer equipment (such as, a personal computer, a server, or network equipment) to perform all or a part of steps of the method as described in the embodiments of the present application. The foregoing storage media include: a USB flash disk, a mobile hard disk, a read-only memory (ROM, Read-Only Memory), a random access memory (RAM, Random Access Memory), a magnetic disk, an optical disk, or other various media capable of storing program codes.

The foregoing descriptions are merely specific embodiments of the present application, but not intended to limit the protection scope of the present application. Any modification or replacement easily thought of by persons skilled in the prior art within the technical scope of the present application should fall within the protection scope of the present application. Therefore, the protection scope of the present application is subject to the protection scope of the claims.

What is claimed is:

1. A method for managing a processor of a computer system, comprising:
   obtaining an online request of a processor of the computer system, the online request requesting an online status of the processor;
   collecting lock contention information of the computer system if a lock contention status flag of the computer system indicates a non-lock thrashing status;
   determining whether the computer system is in a lock thrashing status according to the lock contention information; and
   accepting the online request if it is determined that the computer system is in the non-lock thrashing status.

2. The management method according to claim 1, further comprising:
   setting the lock contention status flag to indicate the non-lock thrashing status when the computer system is initialized.

3. The management method according to claim 1, further comprising:
   rejecting the online request and setting the lock contention status flag to indicate the lock thrashing status if it is determined that the computer system is in the lock thrashing status.

4. The management method according to claim 1, further comprising:
   obtaining an offline request of the processor, accepting the offline request, and setting the lock contention status flag to indicate the non-lock thrashing status.

5. The management method according to claim 4, wherein the lock contention information comprise a lock waiting duration, a lock occupation duration, or lock contention times.

6. The management method according to claim 4, wherein the lock contention information comprise a lock waiting duration, the determining whether the computer system is in a lock thrashing status according to the lock contention information comprises at least one of the following:
   when a ratio of the lock waiting duration to a total duration of the computer system exceeds a lock thrashing threshold, determining that the computer system is in the lock thrashing status; and
   when a ratio of the lock waiting duration to a total duration of the computer system does not exceed the lock thrashing threshold, determining the computer system is in the non-lock thrashing status.

7. The management method according to claim 1, further comprising:
   recording the lock contention information if it is determined that the computer system is in the lock thrashing status.

8. The management method according to claim 1, wherein the lock contention information comprise a lock waiting duration, a lock occupation duration, or lock contention times.

9. The management method according to claim 1, wherein the lock contention information comprise a lock waiting duration, and the determining whether the computer system is in a lock thrashing status according to the lock contention information comprises:
   when a ratio of the lock waiting duration to a total duration of the computer system exceeds a lock thrashing threshold, determining that the computer system is in the lock thrashing status; or
   when a ratio of the lock waiting duration to a total duration of the computer system does not exceed the lock thrashing threshold, determining the computer system is in the non-lock thrashing status.

10. A lock contention management apparatus, comprising:
    a lock contention interface module, configured to obtain an online request of a processor of a computer system, the online request requesting an online status of the processor;
    a lock contention control module, wherein the lock contention control module comprises a flag read unit, a status determination unit, and an online acceptance unit, and the flag read unit is configured to read a lock contention status flag of the lock contention management apparatus; and
    a lock contention detection module, configured to collect lock contention information of the computer system if the online request is obtained by the lock contention interface module, and the lock contention status flag read by the flag read unit indicates a non-lock thrashing status;
    wherein, the status determination unit is configured to determine whether the computer system is in a lock thrashing status according to the lock contention information collected by the lock contention detection module; and the online acceptance unit is configured to accept the online request if the status determination unit determines that the computer system is in the non-lock thrashing status.

11. The lock contention management apparatus according to claim 10, wherein the lock contention control module further comprises:
    an initialization unit, configured to set the lock contention status flag to indicate the non-lock thrashing status when the computer system is initialized.

12. The lock contention management apparatus according to claim 10, wherein the lock contention control module further comprises:
    an online rejection unit, configured to reject the online request and set the lock contention status flag to indicate the lock thrashing status if the status determination unit determines that the computer system is in the lock thrashing status.

13. The lock contention management apparatus according to claim 10, wherein
    the lock contention interface module is further configured to obtain an offline request of the processor of the computer system; and
    the lock contention control module further comprises:
    an offline acceptance unit, configured to accept the offline request and set the lock contention status flag to indicate the non-lock thrashing status if the offline request is obtained by the lock contention interface module.

14. The lock contention management apparatus according to claim 10, further comprising:
    a lock contention log module, configured to record the lock contention information if the status determination unit determines that the computer system is in the lock thrashing status.

15. A computer system, comprising multiple processors and a lock contention management apparatus, wherein the lock contention management apparatus is configured to obtain an online request of a processor of the computer system and request an online status of the processor based on the online request of the processor, wherein the processor is of the multiple processors; collect lock contention information of the computer system if a lock contention status flag of the computer system indicates a non-lock thrashing status; determine whether the computer system is in a lock thrashing status according to the lock contention information; and accept the online request if it is determined that the computer system is in the non-lock thrashing status.

16. The computer system according to claim 15, wherein the lock contention management apparatus is further configured to: set the lock contention status flag to indicate the non-lock thrashing status when the computer system is initialized.

17. The computer system according to claim 15, wherein the lock contention management apparatus is further configured to: reject the online request and setting the lock contention status flag to indicate the lock thrashing status if it is determined that the computer system is in the lock thrashing status.

18. The computer system according to claim 15, wherein the lock contention management apparatus is further configured to: obtain an offline request of the processor, accept the offline request, and set the lock contention status flag to indicate the non-lock thrashing status.

19. The computer system according to claim 15, wherein the lock contention management apparatus is further configured to: record the lock contention information if it is determined that the computer system is in the lock thrashing status.

20. The computer system according to claim 15, wherein the lock contention information comprise a lock waiting duration, in the determining whether the computer system is in a lock thrashing status according to the lock contention information, the lock contention management apparatus is further configured to: determine that the computer system is in the lock thrashing status when a ratio of the lock waiting duration to a total duration of the computer system exceeds a lock thrashing threshold; or determine that the computer system is in the non-lock thrashing status when a ratio of the lock waiting duration to a total duration of the computer system does not exceed the lock thrashing threshold.

21. A nontransitory computer-readable medium having computer executable instructions for performing a method for managing a processor of a computer system comprising:
obtaining an online request of a processor of the computer system, requesting an online status of the processor based on the online request of the processor;
collecting lock contention information of the computer system if a lock contention status flag of the computer system indicates a non-lock thrashing status;
determining whether the computer system is in a lock thrashing status according to the lock contention information; and
accepting the online request if it is determined that the computer system is in the non-lock thrashing status.

* * * * *